(12) United States Patent
Racic

(10) Patent No.: US 11,251,825 B2
(45) Date of Patent: Feb. 15, 2022

(54) DATA TRANSMISSION DEVICE

(71) Applicant: SAFRAN AEROTECHNICS, Plaisir (FR)

(72) Inventor: Zoran Racic, Paris (FR)

(73) Assignee: SAFRAN AEROTECHNICS, Plaisir (FR)

( * ) Notice: Subject to any disclaimer, the term of this patent is extended or adjusted under 35 U.S.C. 154(b) by 0 days.

(21) Appl. No.: 17/045,092

(22) PCT Filed: Apr. 4, 2019

(86) PCT No.: PCT/FR2019/050793
§ 371 (c)(1),
(2) Date: Oct. 2, 2020

(87) PCT Pub. No.: WO2019/193292
PCT Pub. Date: Oct. 10, 2019

(65) Prior Publication Data
US 2021/0159934 A1 May 27, 2021

Related U.S. Application Data

(60) Provisional application No. 62/652,531, filed on Apr. 4, 2018.

(30) Foreign Application Priority Data

Jul. 13, 2018 (FR) ........................................ 1856512
Oct. 25, 2018 (FR) ....................................... 1859892

(51) Int. Cl.
*H04B 1/38* (2015.01)
*H04B 3/54* (2006.01)
(Continued)

(52) U.S. Cl.
CPC ..................................... *H04B 1/40* (2013.01)

(58) Field of Classification Search
None
See application file for complete search history.

(56) References Cited

U.S. PATENT DOCUMENTS 6,192,069 B1  2/2001 Kubinec
9,100,104 B2 * 8/2015 Nguyen ................. H04L 67/12
(Continued)

FOREIGN PATENT DOCUMENTS

FR          2937199 A1    4/2010
WO     WO-2016150970 A1 *  9/2016 ............. H01F 38/14

OTHER PUBLICATIONS

International Search Report dated Jul. 5, 2019, issued in corresponding International Application No. PCT/FR2019/050793, filed Apr. 4, 2019, 3 pages.

(Continued)

*Primary Examiner* — Pablo N Tran
(74) *Attorney, Agent, or Firm* — Christensen O'Connor Johnson Kindness PLLC

(57) ABSTRACT

A data transmission system including an emitting device, a receiving device and a communication link, wherein the emitting device includes: a radio frequency emitter connected to the communication link; a power line connected to the communication link at a connection point, wherein the power line is brought to a supply voltage; and a capacitive coupling component connected between the radio frequency emitter and the connection point, wherein the receiving device includes: a radio frequency receiver connected to the communication link for receiving the radio frequency signal; a power line connected to the communication link at a connection point; and a capacitive coupling component connected between the connection point and the radio fre- (Continued)

quency receiver, wherein the capacitive coupling components transmit the radio frequency signal and block the supply voltage.

10 Claims, 2 Drawing Sheets

(51) Int. Cl.
  *H04B 3/56* (2006.01)
  *H04M 11/04* (2006.01)
  *H04B 1/40* (2015.01)

(56) References Cited

U.S. PATENT DOCUMENTS

| | | | | |
|---|---|---|---|---|
| 9,142,961 | B1* | 9/2015 | Krasowski | H04B 1/04 |
| 9,160,203 | B2* | 10/2015 | Fiorello | H02J 50/90 |
| 9,762,374 | B1* | 9/2017 | Li | H04B 3/54 |
| 10,122,412 | B2* | 11/2018 | Scott | H05B 47/185 |
| 2004/0258141 | A1* | 12/2004 | Tustison | H04B 3/548 |
| | | | | 375/219 |
| 2015/0109073 | A1* | 4/2015 | Guillot | H04L 25/0266 |
| | | | | 333/177 |

OTHER PUBLICATIONS

Written Opinion of the International Searching Authority dated Jul. 5, 2019, issued in corresponding International Application No. PCT/FR2019/050793, filed Apr. 4, 2019, 6 pages.

Grassi, F., et al., "Effects of imbalance on conducted immunity of a PLC link onto a DC power-bus for spacecraft," 2015 Asia-Pacific Symposium on Electromagnetic Compatibility (AP EMC), IEEE, May 26, 2015, Abstract, 2 pages.

Larhzaoui, T., et al., "OFDM PLC transmission for aircraft flight control system," 18th IEEE International Symposium on Power Line Communications and Its Applications, IEEE, Mar. 30, 2014, 6 pages.

* cited by examiner

DATA TRANSMISSION DEVICE

The present invention is in the field of data transmission systems for aircraft.

Aircraft comprise a power distribution network and a data transmission network independent of the power distribution network.

Figure 1:
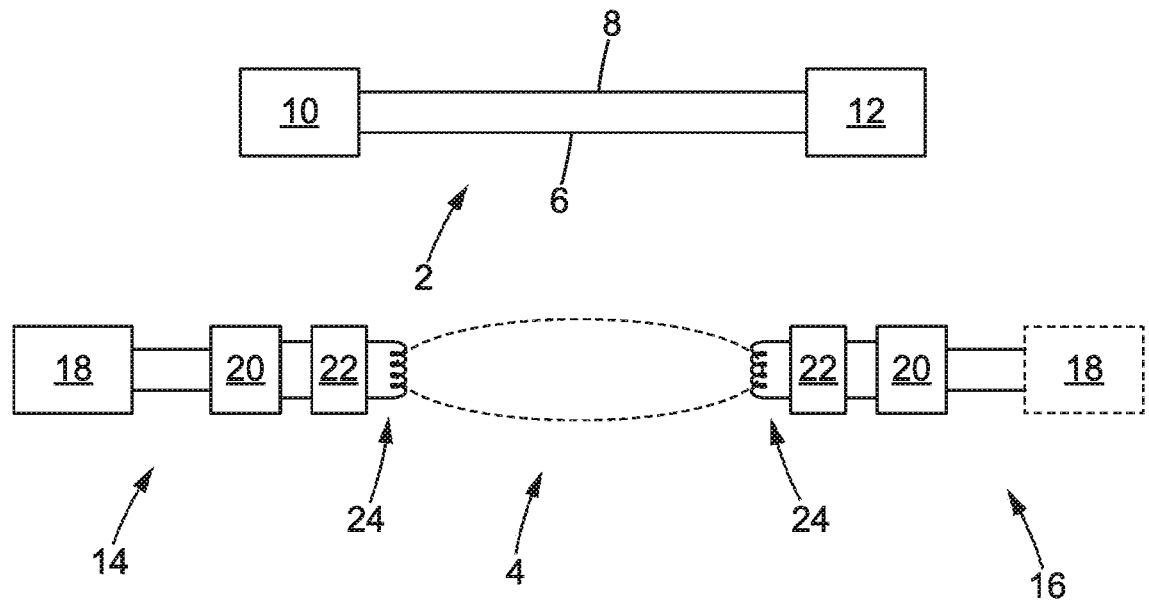

FIG. 1 shows an example of a power transmission system 2 and a data transmission system 4 generally mounted in an aircraft. The power transmission system 2 is independent of the data transmission system 4.

The power-transmission system 2 comprises two cables 6, 8 connected, at one end, to a voltage supply source 10 for the aircraft and, at the other, to a power conversion unit 12 or to electrical equipment 12.

The data transmission system 4 comprises a first emitting-receiving unit 14, and a second emitting-receiving unit 16 suited for transmitting and receiving data to and from the first emitting-receiving unit 14. These data are transmitted via radio frequency waves. The emitting-receiving units 14, 16 are identical. They each comprise a data processing unit 18 able to generate data to be transmitted, a radio frequency emitter-receiver 20 connected to the processing unit 18, a matching network 22 connected to the processing unit, and an emitting and receiving antenna 24 connected to the matching network.

However, these systems are not secured and are not used for critical systems, meaning systems which could lead to the loss of the aircraft.

A goal of the present invention is to propose an alternative transmission system.

For this purpose, the present invention proposes a data transmission system comprising an emitting device, a receiving device and a communication link, where the emitting device comprises:
  a radio frequency emitter having at least one output connected to the communication link, where the radio frequency emitter is suited for generating a radio frequency signal representative of data to be transmitted;
  a power line connected to the communication link at a connection point, where the power line is intended to be brought to a supply voltage;
  at least one capacitive coupling component connected between the output of the radio frequency emitter and the connection point, where said capacitive coupling component is suited for transmitting the radio frequency signal and blocking the supply voltage;

where the receiving device comprises:
  a radio frequency receiver having at least one input connected to the communication link for receiving said radio frequency signal;
  a power line connected to the communication link at a connection point;
  at least one capacitive coupling component connected between the connection point and the input of the radio frequency receiver, where said capacitive coupling component is suited for transmitting the radio frequency signal and blocking the supply voltage.

According to the specific embodiments, the transmitting system comprises one or more of the following characteristics:

the radio frequency emitter comprises a supplemental output and the radio frequency receiver comprises a supplemental input, where the transmission system comprises a supplemental communication link connected between the supplemental output of the radio frequency emitter and the supplemental input of the radio frequency receiver;

where the emitting device comprises:
  a supplemental power line connected to the supplemental communication link at a supplemental connection point; and
  a supplemental capacitive coupling component connected between the supplemental output of the emitter and the supplemental connection point, where the receiving device comprises:
  a supplemental power line connected to the supplemental communication link at a supplemental connection point; and
  a supplemental capacitive coupling component connected between the supplemental connection point and the supplemental input of the radio frequency receiver.

the emitting device and/or the receiving device comprise a transformer connected, on the one side, to the radio frequency emitter and/or to the radio frequency receiver and, on the other side, to the communication link and to the supplemental communication link.

the emitting device and/or the receiving device further comprise a filter suited for blocking the radio frequency signal and for transmitting the supply voltage, where said filter is connected to the power line.

said filter is a transformer.

the communication link is a strand of a controlled impedance cable.

the emitting device comprises an impedance matching network connected between the radio frequency emitter and the capacitive coupling component, where said matching network is suited for matching the impedances of the communication link.

the receiving device comprises an impedance matching network connected between the capacitive coupling component and the radio frequency receiver, where said matching network is suited for matching the impedances of the communication link.

the system further comprises a voltage supply source connected to the power line of the emitting device or the receiving device.

the system further comprises electrical equipment connected to the power line of the emitting device or the receiving device.

Figure 2:
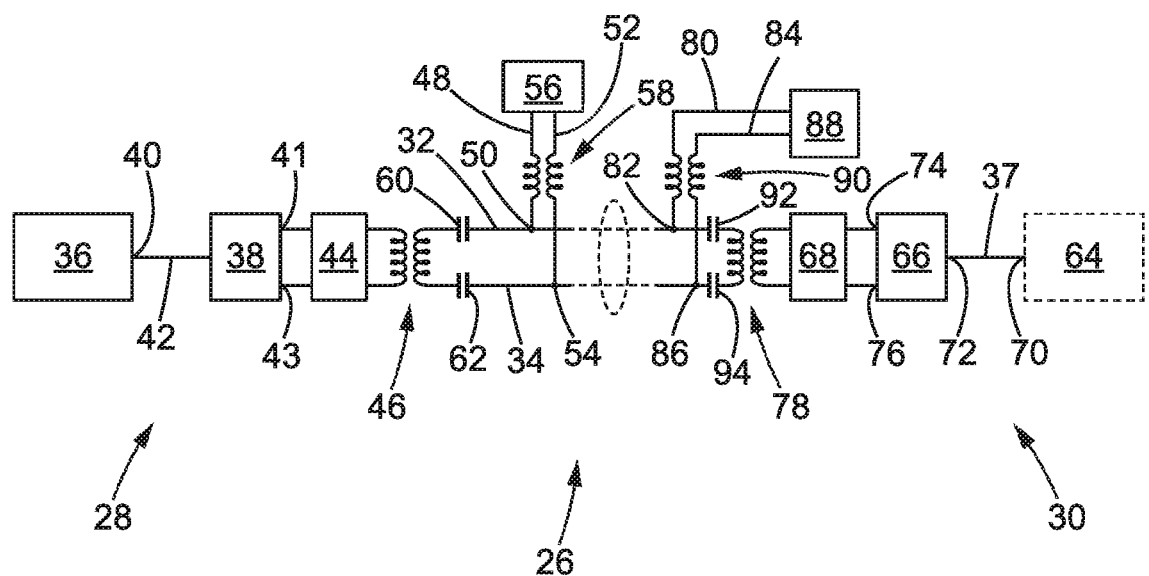
Figure 3:
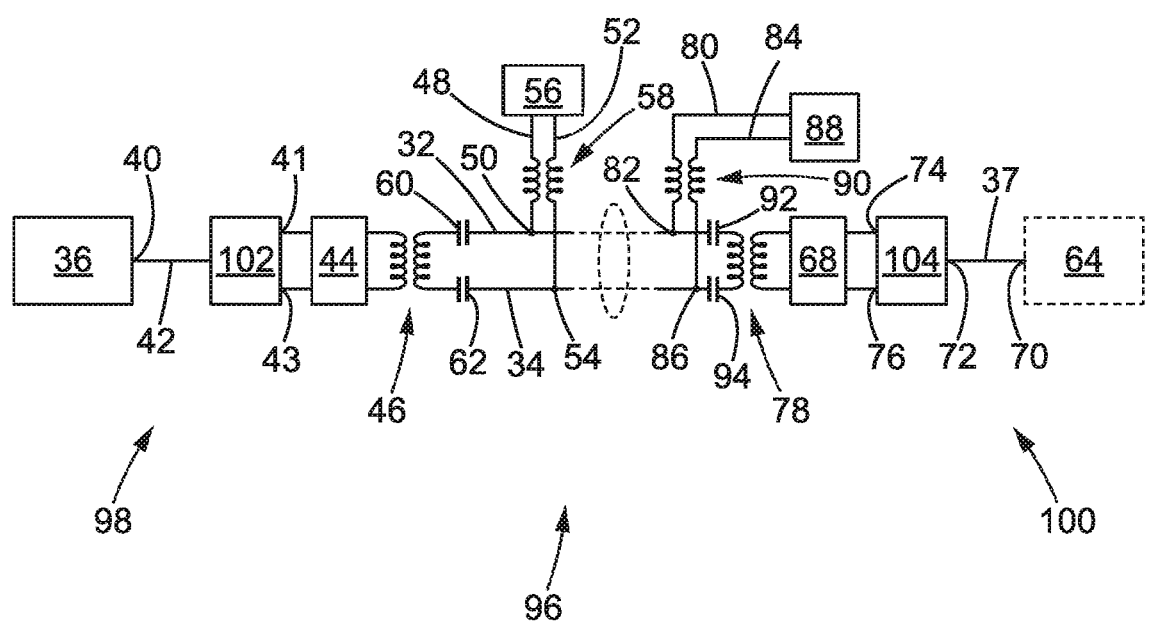

The invention will be better understood upon reading the following description, given solely as an example and made with reference to the following figures in which:

FIG. 1 is a schematic view of a sample data transmission system and power transmission system belonging to the state-of-the-art; and FIG. 2 is a schematic view of a data transmission system according to a first embodiment of the invention; and FIG. 3 is a schematic view of a data transmission system according to a second embodiment of the invention.

Referring to FIG. 2, the data transmission system 26 according to a sample implementation of the present invention comprises a data emitting device 28 able to emit data, a data receiving device 30 able to receive data sent by the emitting device 28, a communication link 32 and an supplemental communication link 34.

The communication links 32, 34 connect the emitting device 28 to the receiving device 30. The communication links 32, 34 are isolated from each other. They are for example made up of a first strand and a second strand of a controlled impedance cable. A RS-485 type cable or an ethernet cable can for example be used.

The emitting device 28 comprises a processing unit 36 and a radio frequency emitter 38 connected to the processing unit 36 by a communication link 42.

The processing unit 36 is made up of a protocol controller.

It comprises an output 40 suited for generating a signal representative of data to be transmitted to the receiving device 30.

The emitter 38 is suited for receiving the signal generated by the processing unit, modulating it and amplifying it. Finally, the emitter 38 is able to transmit a radio frequency signal containing the data according to a differential mode to the communication link 32 and to the supplemental communication link 34. For this purpose, the emitter 38 comprises an output 41 connected to the communication link 32 and a supplemental output 43 connected to the supplemental communication link 34. The radio frequency emitter 38 is for example an RFID emitter.

The communication link 42 is for example an I²C bus type ("Inter-Integrated Circuit"), SPI link ("Serial Peripheral Interface"), RS link ("Recommended Standard") such as an RS-232 link.

The emitting device 28 may comprise an impedance matching network 44 connected to the radio frequency emitter 38 and/or an electric transformer 46 connected to the impedance matching network 44.

The impedance matching network 44 comprises at least one variable impedance and serves to optimize the data transfer.

The electric transformer 46 is suited for galvanically isolating the emitter 38 relative to the communication links 32, 34.

The electrical transformer 46 has a first winding connected to the impedance matching network 44 and a second winding connected the capacitive coupling components 60, 62, as explicitly described below. The first coil acts as an antenna suited for transmitting the radio frequency signal. The second coil acts as an antenna suited for receiving the radio frequency signal emitted by the first coil.

As a variant, the first coil is connected directly to the output 41 and to the supplemental output 43 of the emitter and the second coil is connected to the communication link 32 and to the supplemental communication link 34.

The emission device 28 further comprises a power line 48 connected to the communication link 32 at a connection point 50 and a supplemental power line 52 connected to the supplemental communication link 34 at a supplemental connection point 54.

The emission device 28 can also comprise an aircraft voltage supply source 56 such as the aircraft generator or a battery. The power lines 48, 52 are connected to this supply source 56. The power line 48 is for example connected to a 28 V potential. The supplemental power line 52 is connected to the current return of the voltage supply source.

Advantageously, the emitting device 28 may further comprise a filter 58 connected to the power line 48 upstream from the connection point 50 and to the supplemental power line 52 downstream from the connection point 54, with reference to the direction of the supply current coming from the supply source 56. In particular, the filter 58 is connected between the supply source 56 and the connection points 50, 54.

The filter 58 serves to block the transmission of the radio frequency signal to the supply source 56 while letting the supply voltage pass.

This filter 58 is for example made up of a transformer.

The emitting device 28 further comprises a capacitive coupling component 60 connected between the output of the emitter and the connection point 50, and a supplemental capacitive coupling component 62 connected between the supplemental 43 output 41 of the emitter and the supplemental connection points 54.

The capacitive coupling component 60 and the supplemental capacitive coupling component 62 are suited for transmitting the radio frequency signal and blocking the supply voltage. In that way, the supply voltage applied by the supply source 56 is not transmitted to the radio frequency emitter 38.

The capacitive coupling components 60, 62 are, for example, made up of capacitors.

Advantageously, the capacitive coupling components 60, 62 block the supply voltage so that it is and transmitted to the radio frequency emitter 38.

The receiving device 30 comprises a processing unit 64 and a radio frequency receiver 66 connected to the processing unit.

The processing unit 64 is identical or similar to the processing unit 36 of the emitting device. It comprises an input 70 connected to an output 72 of the receiver 66 by an I²C bus, SPI link or RS link type communication link 37.

The radio frequency receiver 66 comprises the output 72, an input 74 connected to the communication link 32 and a supplemental input 76 connected to the supplemental communication link 34.

The receiving device 30 may also comprise an impedance matching network 68 connected to the radio frequency receiver 66 and/or an electric transformer 78 connected to the impedance matching network 68.

The impedance matching network 68 and the transformer 78 are identical or similar to the matching network 68 and the transformer 46 of the emitting device 28. In particular, the electric transformer 78 has a first coil connected directly to the output 74 and to the supplemental output 76 of the receiver and a second coil connected to the communication link 32 and to the supplemental communication link 34.

The receiving device 30 comprises a power line 80 connected to the communication link 32 at a connection point 82 and a supplemental power line 84 connected to the supplemental communication link 34 at a supplemental connection point 86.

The receiving device 30 may also comprise equipment 88 connected to the power line 32 and to the supplemental power line 34. The equipment 88 comprises one or more units of electrical equipment.

Preferably, the receiving device 30 comprises a filter 90 connected to the power line 80 downstream from the connection point 82 and to the supplemental power line 84 upstream from the supplemental connection point 86, with reference to the direction of the supply current coming from the supply source 56 and feeding the equipment 88. In particular, the filter 90 is connected between the equipment 88 and the connection points 82 and 86. This filter 90 is able to block the radio frequency signal and let the supply voltage pass. The filter 90 is for example made up of a transformer.

The device 30 further comprises a capacitive coupling component 92 connected between the connection point 82 and the input 74 of the radio frequency receiver 66, and a supplemental capacitive coupling component 94 connected between the connection point 86 and the input 76 of the radio frequency receiver 66.

The capacitive coupling components 92, 94 are suited for blocking the supply voltage coming from the voltage source 56 and letting the radio frequency signal to pass. The capacitive coupling components 92, 94 comprise one or more capacitors.

As a variant, the equipment 88 connected to the emitting device 28 and the voltage source 56 is connected to the receiving device 30. In this case, it is the receiving device 30 which supplies the emitting device 28 with voltage, since the data are sent from the emitting device 28 to the receiving device 30.

As a variant, the emitting device 28 and/or the receiving device 30 does not comprise an electric transformer 46, 78.

As variant, the power line 48, 80 and the supplemental power line 52, 84 of the emitting device 28 and/or the receiving device 30 does not comprise a filter 58, 90.

Also as a variant, the transmitting system 26 comprises a single communication link 32 and the emitter 38 comprises a single output 41 able to transmit the radio frequency signal representative of the data to be transmitted over the single communication link in a non-differential mode.

In operation, the radio frequency emitter 38 modulates the data coming from the processing unit 36 onto a radio frequency signal and transmits the resulting signal to the communication links 32, 34. The data are thus transmitted from the emitting device 28 to the receiving device 30. The data received are demodulated by the radio frequency receiver 66 and then sent to the processing unit 64. In parallel, the supply voltage coming from the supply source 56 is from power lines 48, 52 towards the communication links 32, 34. This supply voltage is transmitted to the power lines 80, 84. This supply voltage powers all of the electrical equipment 88.

The data transmission system 96 according to the second embodiment of the invention shown in FIG. 3 is identical to the data transmission system according to the first embodiment except for the fact that it comprises a first emitting-receiving device 98 in place of the emitting device 28, and a second emitting-receiving device 100 in place of the receiving device 30.

For this purpose, in this embodiment, the radio frequency emitter 38 is a radio frequency emitter-receiver 102 and the radio frequency receiver 66 is a radio frequency emitter-receiver 104. The other components of the transmission system 96 according to the second embodiment are identical or similar to the components from the transmission system 26 according to the first embodiment and will not be described a second time.

The operation of the transmission system according to the second embodiment is similar to the operation of the transmission system according to the first embodiment. Data are transmitted from the first emitting-receiving device 98 the second emitting-receiving device 100, and data are transmitted from the second emitting-receiving device 100 to the second emitting-receiving device 98. The voltage source 56 supplies all equipment 88. The supply voltage is transmitted by the power lines 48, 58 for the first device 98, the communication lines 32, 34 and the power lines 80, 84 for the second device 100.

Obviously, the invention is not limited to the embodiments previously described and provided solely as examples. It encompasses various modifications, alternative forms and other variance which the person skilled in the art could conceive in the context of the present invention and in particular any combinations of the various operating modes previously described, which can be taken separately or in combination.

The invention claimed is:

1. A data transmission system, said system comprising an emitting device, a receiving device and a communication link, wherein the emitting device comprises:
    a radio frequency emitter having at least one output connected to the communication link, the radio frequency emitter comprising a supplemental output, wherein the radio frequency emitter is configured for generating a radio frequency signal representative of data to be transmitted;
    a power line connected to the communication link at a connection point, wherein the power line is intended to be brought to a supply voltage; and
    at least one capacitive coupling component connected between the output of the radio frequency emitter and the connection point, wherein said capacitive coupling component is configured for transmitting the radio frequency signal and blocking the supply voltage;

wherein the receiving device comprises:
    a radio frequency receiver having at least one input connected to the communication link for receiving said radio frequency signal, the radio frequency receiver comprising a supplemental input;
    a power line connected to the communication link at a connection point; and
    at least one capacitive coupling component connected between the connection point and the input of the radio frequency receiver, wherein said capacitive coupling component is configured for transmitting the radio frequency signal and blocking the supply voltage, wherein the data transmission system further comprises a supplemental communication link connected between the supplemental output of the radio frequency emitter and the supplemental input of the radio frequency receiver;

wherein the emitting device further comprises:
    a supplemental power line connected to the supplemental communication link at a supplemental connection point; and
    a supplemental capacitive coupling component connected between the supplemental output of the emitter and the supplemental connection point, wherein the receiving device comprises:
    a supplemental power line connected to the supplemental communication link at a supplemental connection point; and
    a supplemental capacitive coupling component connected between the supplemental connection point and the supplemental input of the radio frequency receiver.

2. The transmission system according to claim 1, wherein the emitting device or the receiving device comprise a transformer connected, on the one side, to the radio frequency emitter or to the radio frequency receiver and, on the other side, to the communication link and to the supplemental communication link.

3. The transmission system according to claim 1, wherein the emitting device and/or the receiving device further comprise a filter configured for blocking the radio frequency signal and for transmitting the supply voltage, wherein said filter is connected to the power line.

4. The transmission system according to claim 3 wherein said filter is a transformer.

5. The transmission system according to claim 1, wherein the communication link is a strand of a controlled impedance cable.

6. The transmission system according to claim 1, wherein the emitting device comprises an impedance matching network connected between the radio frequency emitter and the capacitive coupling component, wherein said matching network is configured for matching the impedances of the communication link.

7. The transmission system according to claim 1, wherein the receiving device comprises an impedance matching network connected between the capacitive coupling component and the radio frequency emitter, wherein said matching network is configured for matching the impedances of the communication link.

8. The transmission system according to claim 1, further comprising a voltage supply source connected to the power line of the emitting device or the receiving device.

9. The transmission system according to claim 1, further comprising electrical equipment connected to the power line of the emitting device or the receiving device.

10. A data transmission system, said system comprising an emitting device, a receiving device and a communication link,
wherein the emitting device comprises:
    a radio frequency emitter having at least one output connected to the communication link, wherein the radio frequency emitter is configured for generating a radio frequency signal representative of data to be transmitted;
    a power line connected to the communication link at a connection point, wherein the power line is intended to be brought to a supply voltage; and
    at least one capacitive coupling component connected between the output of the radio frequency emitter and the connection point, wherein said capacitive coupling component is configured for transmitting the radio frequency signal and blocking the supply voltage;
wherein the receiving device comprises:
    a radio frequency receiver having at least one input connected to the communication link for receiving said radio frequency signal;
    a power line connected to the communication link at a connection point; and
    at least one capacitive coupling component connected between the connection point and the input of the radio frequency receiver, wherein said capacitive coupling component is configured for transmitting the radio frequency signal and blocking the supply voltage, wherein the emitting device and/or the receiving device further comprise a transformer configured for blocking the radio frequency signal and for transmitting the supply voltage, wherein said transformer is connected to the power line.

* * * * *